United States Patent
Saha et al.

(10) Patent No.: US 8,447,961 B2
(45) Date of Patent: May 21, 2013

(54) MECHANISM FOR EFFICIENT IMPLEMENTATION OF SOFTWARE PIPELINED LOOPS IN VLIW PROCESSORS

(75) Inventors: Anindya Saha, Bangalore (IN); Manish Kumar, Nalanda (IN); Hemant Mallapur, Bangalore (IN); Santhosh Billava, Kundapur Taluk (IN); Viji Rajangam, Thirunagar (IN)

(73) Assignee: Saankhya Labs Pvt Ltd, Bangalore (IN)

( * ) Notice: Subject to any disclaimer, the term of this patent is extended or adjusted under 35 U.S.C. 154(b) by 696 days.

(21) Appl. No.: 12/708,288

(22) Filed: Feb. 18, 2010

(65) Prior Publication Data
US 2010/0211762 A1    Aug. 19, 2010

(30) Foreign Application Priority Data
Feb. 18, 2009  (IN) .............................. 347/CHE/2009

(51) Int. Cl.
G06F 9/40    (2006.01)
(52) U.S. Cl.
USPC ........................................... 712/241; 712/24
(58) Field of Classification Search
USPC ................................................ 712/24, 241
See application file for complete search history.

(56) References Cited

U.S. PATENT DOCUMENTS

| | | | |
|---|---|---|---|
| 5,375,238 A * | 12/1994 | Ooi | 712/241 |
| 6,950,929 B2 * | 9/2005 | Chung et al. | 712/241 |
| 6,999,904 B2 * | 2/2006 | Weber et al. | 702/189 |
| 7,130,963 B2 * | 10/2006 | Asaad et al. | 711/115 |
| 7,386,709 B2 * | 6/2008 | Vasekin | 712/242 |
| 7,400,531 B2 * | 7/2008 | Ohtake et al. | 365/185.11 |
| 7,499,835 B2 * | 3/2009 | Weber et al. | 702/185 |
| 7,873,497 B2 * | 1/2011 | Weber et al. | 702/185 |
| 7,991,984 B2 * | 8/2011 | Pisek | 712/241 |
| 2005/0257037 A1 * | 11/2005 | Elwood et al. | 712/242 |

* cited by examiner

*Primary Examiner* — Aimee Li
(74) *Attorney, Agent, or Firm* — Rahman LLC

(57) ABSTRACT

A system to implement a zero overhead software pipelined (SFP) loop includes a Very Long Instruction Word (VLIW) processor having an N number of execution slots. The VLIW processor executes a plurality of instructions in parallel without any limitation of an instruction buffer size. A program memory receives a Program Memory address to fetch an instruction packet. The program memory is closely coupled with the instruction buffer size to implement the zero overhead software pipelined (SFP) loop. The size of the zero overhead software pipelined (SFP) loop can exceed the instruction buffer size. A CPU control register includes a block count and an iteration count. The block count is loaded into a block counter and counts the plurality of instructions executed in the SFP loop, and the iteration count is loaded into an iteration counter and counts a number of iterations of the SFP loop based on the block count.

20 Claims, 15 Drawing Sheets

MECHANISM FOR EFFICIENT IMPLEMENTATION OF SOFTWARE PIPELINED LOOPS IN VLIW PROCESSORS

BACKGROUND

1. Technical Field

The embodiments herein generally relate to looping functionality of VLIW processor and more particularly to a hardware looping mechanism configured to provide Software Pipelined loop with zero-overhead which executes large chunk of instructions with very small buffer depth.

2. Description of the Related Art

A typical processor involves various functional units and the processor performance is often increased by overlapping the steps of multiple instructions, using a technique called pipelining. Software pipelining is a technique used to optimize loops, in a manner that parallels hardware pipelining.

To pipeline instructions, the various steps of instruction execution may be also performed by independent units called "pipeline stages". The result of each pipeline stage is communicated to the next pipeline stage via a register (or latch) arranged between two stages. In most cases, pipelining reduces the average number of cycles required to execute a task.

Some of the architectures attempting to improve performance by exploiting instruction parallelism include very-long-instruction-word (VLIW) processors and super-pipelined processors. VLIW processors increase processor speed by scheduling instructions in software rather than hardware. In addition, VLIW and superscalar processors can each be super-pipelined to reduce processor cycle time by dividing the major pipeline stages into sub-stages. This can then be clocked at a higher frequency than the major pipeline stages.

Many electronics devices are now embedded with digital signal processors (DSPs), or specialized processors that have been optimized to handle signal processing algorithms. DSPs may be implemented as either scalar or superscalar architectures, and may have several features in common with RISC-based counterparts. An efficient looping mechanism, in particular, is often critical in digital signal processing applications because of the repetitive nature of signal processing algorithms.

In order to minimize the execution time required for looping, some DSP architectures may support zero-overhead loops by including dedicated internal hardware (also referred to as a "hardware looping mechanism). These hardware looping mechanisms may be included for monitoring loop conditions and to decide in parallel with all other operations whether to increment the program counter, or branch without cycle-time penalty to the top of the loop. Unlike conventional RISC processors, which may implement a "test-and-branch" at the end of every loop iteration, DSP architectures with zero-overhead looping mechanisms require no additional instructions to determine when loop iteration has been completed.

For instance, typically DSP architectures provide a zero-overhead looping on a single instruction or multiple instructions. However, these looping mechanisms provide extremely limited flexibility. Typical DSP CPU Architectures provide Zero Overhead Looping, by having a dedicated hardware like loop buffer of significant size. These loop buffer can hold the block of instructions that need to be executed in the loop, only to the limit as allowed by the instruction buffer size and is strictly dependent on it. This poses a problem when there is a need to implement certain application kernels, which require large loops exceeding this limit.

SUMMARY

In view of the foregoing, an embodiment herein provides a system to implement a zero overhead software pipelined (SFP) loop. The system includes a Very Long Instruction Word (VLIW) processor having an N number of execution slots and the VLIW processor executes a plurality of instructions in parallel without any limitation of an instruction buffer size. A program memory receives a Program Memory address to fetch an instruction packet. The program memory is closely coupled with the instruction buffer size to implement the zero overhead software pipelined (SFP) loop. The size of the zero overhead, software pipelined (SFP) loop can exceed the instruction buffer size.

A CPU control registers includes a block count and an iteration count. A block counter loads the block count and counts the plurality of instructions executed in the SFP loop, and the iteration counter loads the iteration count and counts a number of iterations of the SFP loop based on the block counter. A loop instruction fetch logic tracks at least one of the instructions of the plurality of instructions. A control logic generates at least one of a control signals received by the instruction buffer. The control signals are generated to execute the SFP loop.

The iteration counter is initially loaded and decremented by one when the block count reaches zero. The block counter is initially loaded with the block count and decremented by one when one of the instructions is dispatched. When the Iteration Counter reaches zero, the SFP loop reloads the fetch program address with a start address of the SFPLOOP and continues till the last iteration. The SFP loop is at least one of a short SFP loop and a long SFP loop.

In another embodiment, a method of implementing a short Software Pipelined (SFP) loop in a system is provided. The system includes a processor having an N number of execution slots that executes a plurality of instructions in parallel without any limitation of an instruction buffer size, a program memory that receives a program memory address to fetch an instruction packet. The program memory is closely coupled with the instruction buffer size to implement the zero overhead, software pipelined (SFP) loop. The size of the zero overhead software pipelined (SFP) loop can exceed the instruction buffer size. The CPU control register (CCR) includes a block count and an iteration count. The block counter loads the block count and counts the plurality of instructions executed in the SFP loop, and the iteration counter loads the iteration count and counts a number of iterations of the SFP loop based on the block counter.

The method includes determining if an instruction of the short SFP loop is encountered at the execution packet boundaries, storing a start address on the instruction being encountered, storing an iteration count in the iteration counter and the block count in the block counter, computing a last instruction address, and determining if the block count is greater than a maximum short block size. The maximum short block size is equal to minimum depth of instruction buffer minus size of one fetch packet. The short SFP loop is executed when the block count being lesser than the maximum short block size.

The method further includes generating a next program memory (PMEM) address, determining if the PMEM address is equal to a last instruction address, determining an execution is finished if the PMEM address is equal to the last instruction, and generating a next PMEM address if the execution of the short SFP loop is finished.

An execution of the short SFP loop is started, in parallel with the generating the next PMEM address. An iteration count is loaded into an iteration counter and a read pointer is saved. Block count is loaded into a block counter and the iteration count is decremented. An execute packet is dispatched and block count is decremented. It is determined if the block count is equal to zero. It is determined if the iteration count is equal to zero if the block count is equal to zero.

An execute packet is dispatched on the block count not being equal to zero. An execution is exited from loop execute instruction outside the short SFP loop if the iteration count is equal to zero. No read request is sent to Program Memory (PMEM) if the execution of the short SFP loop is not finished. A read pointer reassigned with saved read pointer if the iteration count is not equal to zero when the block counter reaches zero. A block count is loaded into a block counter and an iteration count is decremented when the read pointer is being reassigned to saved read pointer.

In yet another embodiment, a method of implementing a long SFP loop in a system is provided. The system includes a processor having an N number of execution slots that executes a plurality of instructions in parallel without any limitation of an instruction buffer size, a program memory that receives a program memory address to fetch an instruction packet. The program memory is closely coupled with the instruction buffer size to implement the zero overhead, software pipelined (SFP) loop. The size of the zero overhead software pipelined (SFP) loop can exceed the instruction buffer size. A CPU control registers (CCRs) including a block count and an iteration count. The block counter loads the block count and counts the plurality of instructions executed in the SFP loop, and the iteration counter loads the iteration count value and counts the number of iterations of the SFP loop based on the block counter.

The method includes determining if an instruction of the long SFP loop is encountered at the execution packet boundaries, storing a start address on the instruction being encountered, storing an iteration count and an block count, computing a last instruction address, and determining if the block count is greater than a maximum short block size. The long SFP loop is executed when the block count being greater than the maximum short block size.

The method further includes generating a next program memory (PMEM) address, determining if the PMEM address is equal to a last instruction address, determining an execution is finished if the PMEM address is equal to the last instruction, and generating a next PMEM address if the execution is finished.

An execution of the long SFP loop is started, in parallel with the generating the next PMEM address. An iteration count is loaded into an iteration counter. A block count is loaded into a block counter and the iteration count is decremented. An execute packet is dispatched. The block count is decremented. It is determined if the block count is equal to zero. It is determined if the iteration count is equal to zero if the block count is equal to zero. An execution is exited from a loop execute instruction outside the long SFP loop if the block count and the iteration count values are equal to zero.

A start address is sent to the program memory (PMEM) if the execution of the long SFP loop is not finished. An execute packet is dispatched if the block count is not equal to zero. A block count is loaded into a block counter and an iteration count is decremented if the iteration count is not equal to zero.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
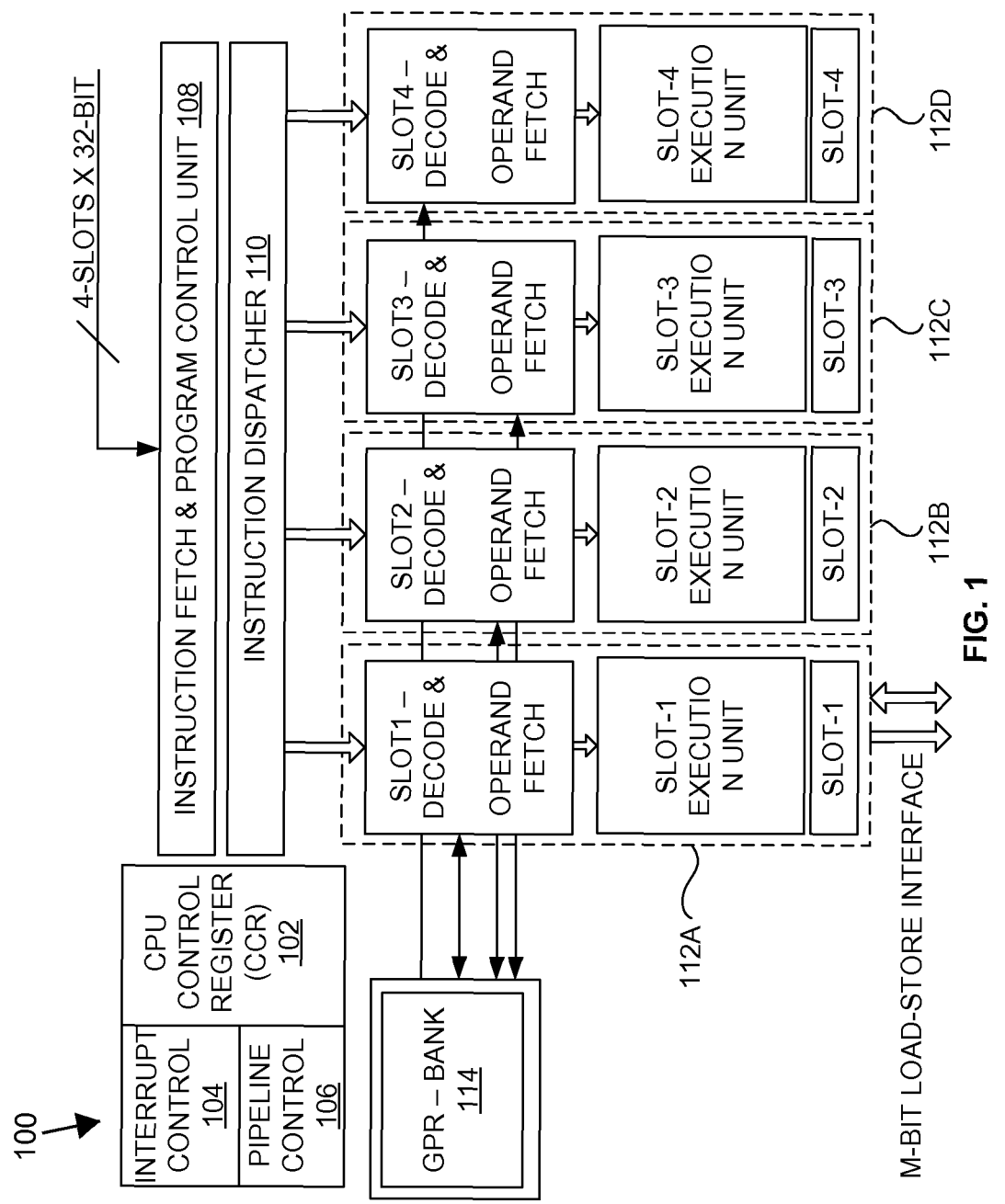
FIG. 1 illustrates a block diagram of a 4-slot VLIW CPU architecture according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve this by providing a mechanism, where arbitrarily large loops can be implemented with zero overhead (either in single-issue or VLIW type of processors), without any limitation of an instruction buffer size. Referring now to the drawings, and more particularly to FIGS. 1 through 11, where similar reference characters denote corresponding features consistently throughout the figures, there are shown preferred embodiments.

FIG. 1 illustrates a block diagram of 4-slot VLIW CPU architecture 100 according to an embodiment herein. The 4-slot VLIW CPU architecture 100 includes a CPU Control Register (CCR) 102, an Interrupt Control 104, a Pipeline Control 106, an Instruction fetch and Program Control Unit 108, an Instruction Dispatcher 110, a Slot 1 112 A, a Slot 2 112 B, a Slot 3 112 C, a Slot 4 112 D and a GPR-bank 114. The CPU Control Register (CCR) 102 is a processor register which controls the general behavior of the CPU.

A Block Count and an iteration Count are configured in the CPU Control Register (CCR) 102, before using SFPLOOP Instruction. In an example embodiment to execute loop of the Block Count "NB" and iteration Count "ITR", the block counter 212 and iteration counter 210 needs to be updated. The Interrupt Control 104 controls a CPU response to external events (which appears in the form of interrupts or exceptions). The Pipeline control 106 ensures that the timing of various controls signals responsible for ensuring correctness of pipeline behavior of the CPU.

The Instruction fetch and Program Control Unit 108 fetches the instructions from the memory. In one embodiment, the address of the instruction to be fetched is in Program Counter. Program Control Unit (PCU) 108 coordinates program execution along with processing of interrupts and exceptions. The instruction dispatcher 110 dispatches instructions to different execution unit. The Slot 1 112 A, the Slot 2 112 B, the Slot 3 112 C, the Slot 4 112 D performs instruction decode, operand fetch and executes the instruction functionality. The GPR-bank 114 is a general purpose register bank for storing temporary data.

Figure 2:
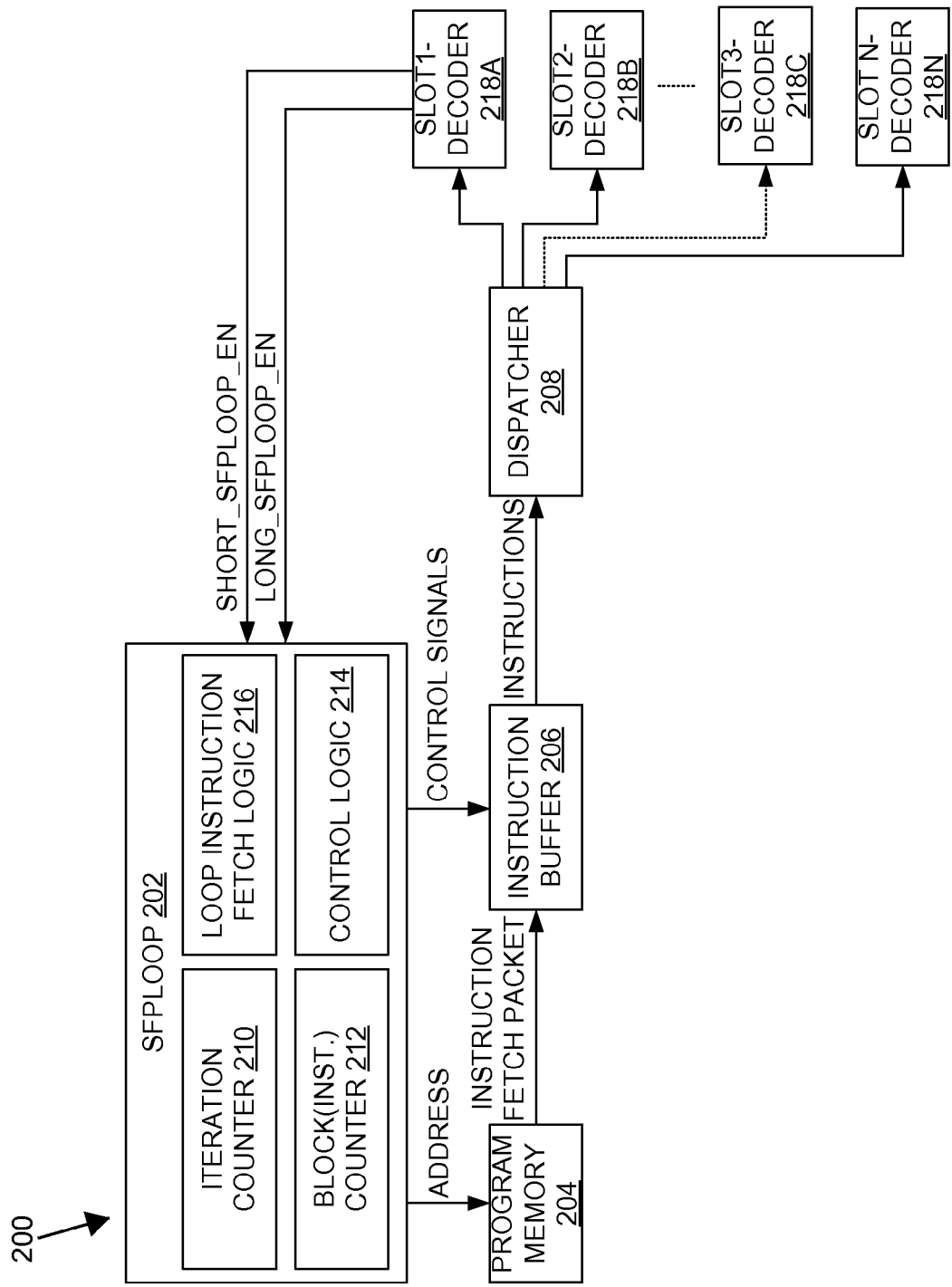
FIG. 2 illustrates a block diagram of a Software Pipelined loop mechanism 200 within the Program Control Unit according to an embodiment herein.

FIG. 2 illustrates a block diagram of a Software Pipelined loop mechanism 200 within the Program Control Unit 104 according to an embodiment herein. The software pipelined loop mechanism includes a software pipeline loop (SFP) block 202, a program memory 204, an instruction buffer 206, a dispatcher 208. The SFP block 202 includes an iteration counter block 210, a block (instruction) counter 212, a control logic block 214, a loop instructions fetch logic block 216, and a Slot 1 decoder 218 A, Slot 2 decoder 218 B, Slot 3 decoder 218 C, Slot N decoder 218 N.

In one embodiment, the slot 1-N decoders 218A-N are decoders of the execution units. In another embodiment, the decoders are independent of SFP loop mechanism. The iteration counter block 210 is initially loaded with the Iteration count (programmed in CCR) and decremented by one when the block count reaches zero. The Program Address value launched is updated corresponding to a label that is stored in the "loop_start_address" register when the Iteration counter is not equal to zero. The ITR count zero shows that there is no loop or the last iteration of the loop is in progress.

The block counter 212 is initially loaded with the Block Count (programmed in the CCR register) and decremented by one when one instruction is dispatched. In one embodiment, if multiple instructions are dispatched, this is decremented accordingly. In another embodiment, when the value of Block Counter reaches zero, the counter is reloaded with the original Block count if the Iteration count (as shown by the Iteration counter) has not reached zero. When the iteration count reaches zero, the loop completion occurs and Program Counter is updated for sequential execution of the program. Accordingly, for the next cycle, the loop is executed again. In one embodiment, block sizes range from 1 to ($2^{NB}-1$) instruction words. In one embodiment, NB is the width of the block counter. The number of iterations which may be supported ranging from 1 to ($2^{ITR}-1$). In one embodiment, ITR is the width of the Iteration Counter.

The Control logic block 214 generates control signals for execution of the loop as specified by a user. The LOOP instruction fetch logic 216 tracks a fetch packet. In one embodiment, when all the instructions associated with the loop is fetched, the loop reloads the fetch program address with start address (also termed as loop_start_address) of the SFPLOOP and continues till the last iteration.

The program memory 204 receives the loop address from the SFP loop block 202 and fetches an instruction packet to the instruction buffer block 206. The instruction buffer block 206 receives the control signals from the control logic block 214 and sends the instructions to the dispatcher block 208. The program memory 204 is closely coupled with the instruction buffer block 206 to implement the zero overhead software pipelined (SFP) loop. In one embodiment, the size of the zero overhead software pipelined (SFP) loop can exceed the instruction buffer block 206. The dispatcher of the dispatcher block 208 finds the execution packet boundaries and determines instruction to specific execution slots 218. The dispatcher routes the appropriate instructions to the respective decoder Slots 218, of the corresponding execution unit(s).

Figure 3A:
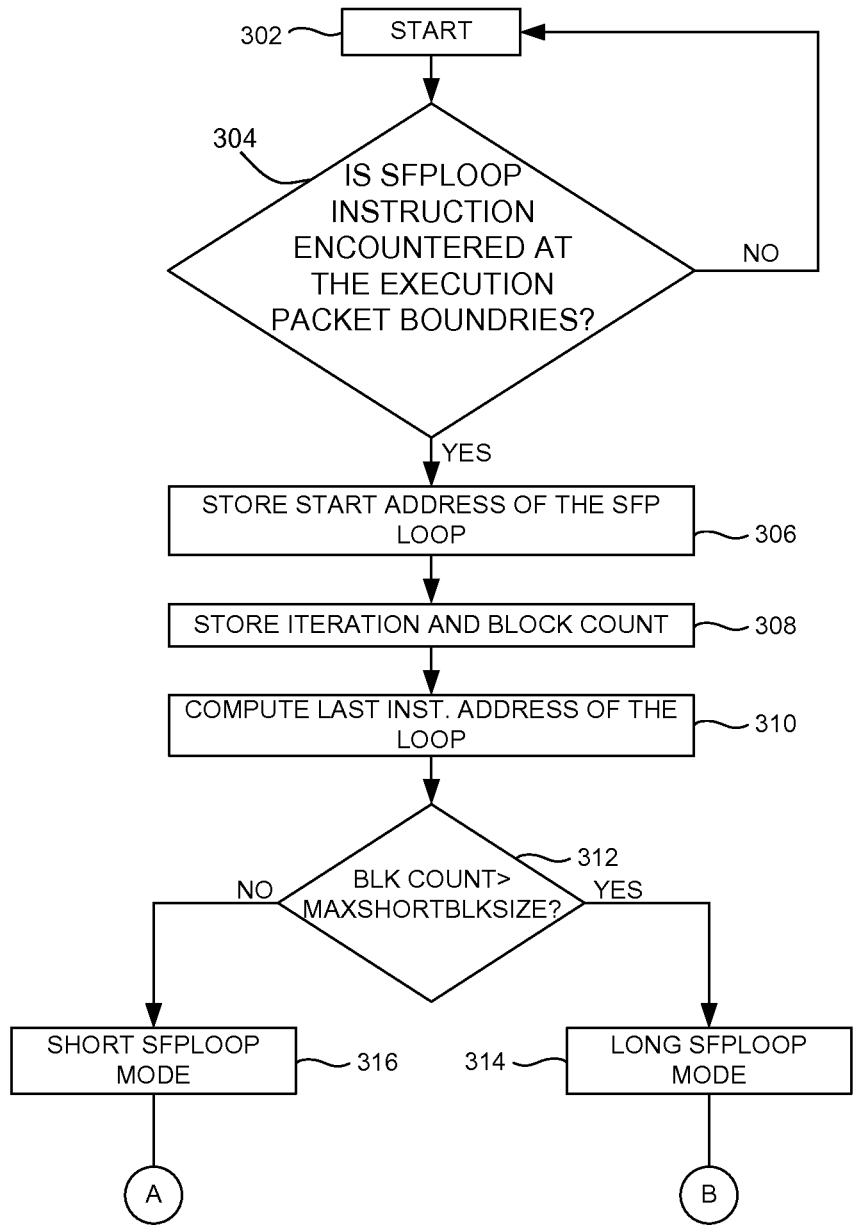
FIG. 3A is a flow diagram illustrating a method of implementing a SFP loop according to an embodiment herein.

FIG. 3A is a flow diagram illustrating a method of implementing a SFP loop according to an embodiment herein. In step 302, an SFP loop implementation is started. In step 304, it is checked whether the SFP loop instruction is encountered at the execution packet boundaries. If the SFP loop is encountered (if Yes) then a start address of the SFP loop is stored in step 306, else (if No) step 302 is repeated. In step 308, the iteration count and a block count are stored. In one embodiment, the iteration count and the block count may be stored in internal hardware registers.

In step 310, the last instruction address of the SFP loop is computed. In step 312, it is checked whether block count (e.g., a BLK count) is greater than a maximum short block size (e.g., a MaxSHORTBLK size). If the block count (e.g., the BLK count) is greater than the maximum short block size (e.g., the Max SHORTBLK size), (if Yes) then a long SFP loop mode is executed in step 314. Else, (if No) a short SPF loop mode is executed in step 316. It should be noted that MaxSHORTBLK size is derived as the minimum depth of instruction buffer minus size of one fetch packet.

Figure 3B:
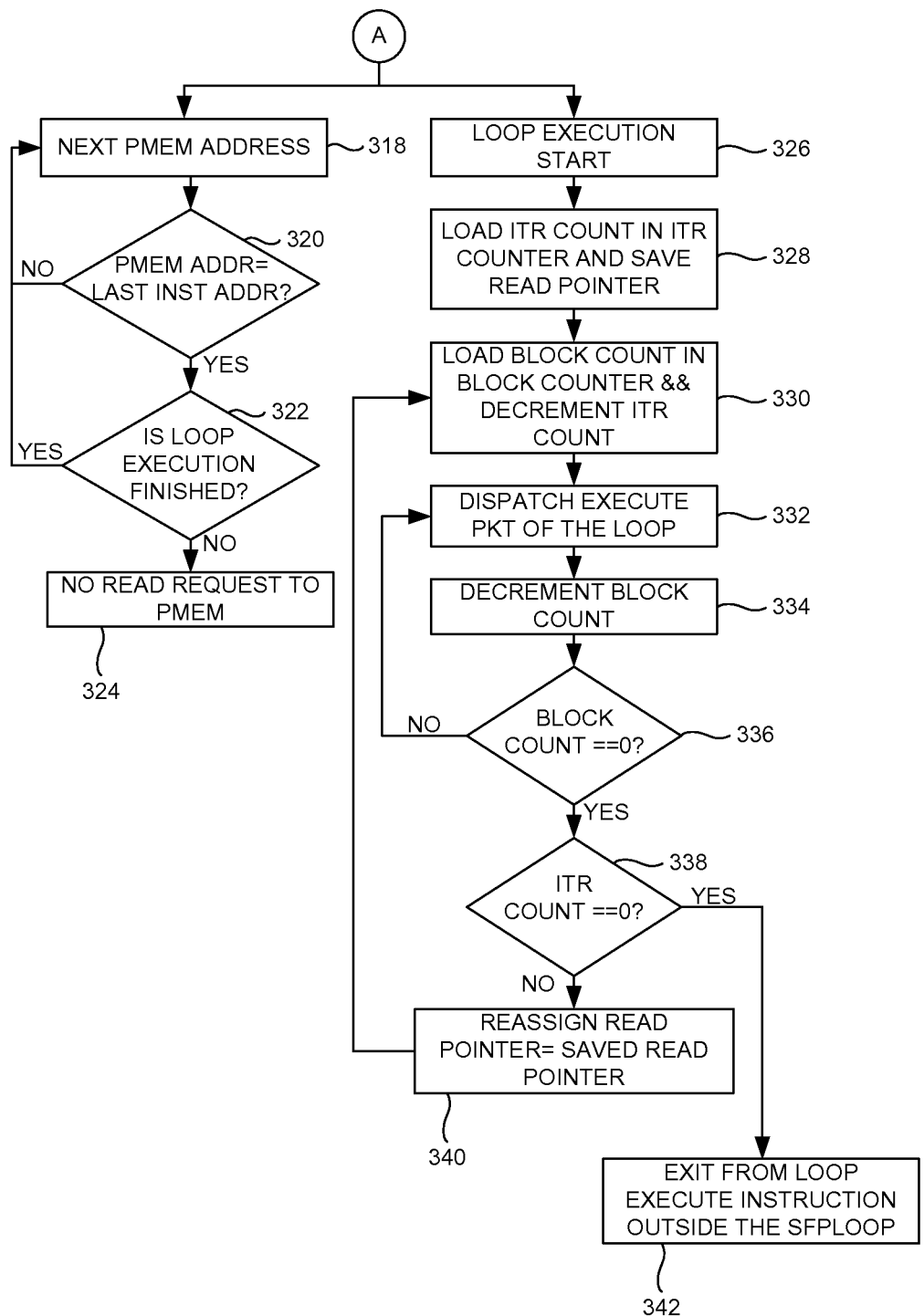
FIG. 3B is a continuation of FIG. 3A illustrating the Short SFP loop execution according to an embodiment herein.

FIG. 3B is a continuation of FIG. 3A illustrating the Short SFP loop execution according to an embodiment herein. In step 318, a next PMEM address is generated. In step 320, it is checked whether the PMEM address is equal to the last instruction address. If the PMEM address is equal to the last instruction address (if Yes), then it is checked whether the loop execution is finished in step 322. Else, (if No) step 318 is repeated. If the loop execution is finished then step 318 is repeated, else (if No) request to PMEM is not issued in step 324.

In Parallel, with generating a next Program Memory address (PMEM) address, the loop execution is also started in step 326. Subsequently, in step 326, the loop execution is started. In step 328, an iteration count is loaded in the iteration counter and read pointer of instruction buffer is saved. In step 330, a block count is loaded in the block counter and the iteration counter is decremented. In step 332, an execute packet of the loop is dispatched. In step 334, the block count is decremented. In step 336, it is checked whether the block count is equal to zero (i.e., block count=0). If the block counter is zero (if Yes) then it is checked whether the iteration count is equal to zero in step 338, else, (if No) go back and perform step 332. If the iteration count is not equal to zero (if No), then read pointer is reassigned to be equal to the saved read pointer (saved earlier in step 328) in step 340 and go back and perform step 330. Else, (if Yes) the loop execute instruction is exited from normal execution in step 342.

In one embodiment, in the short SFPLOOP mode, the program control will only fetch all the instructions that belong to the loop. Once these fetches are complete, no further read requests are issued to the program memory. Further, a program is fetched, only when the last iteration of the loop starts. When the SFPLOOP instruction is encountered for the first time in decode phase, the read pointer of the instruction buffer is stored in a register (as read_pointer_stored), since this corresponds to the start address of the loop.

Subsequently, the Iteration counter and Block Counter are initialized, depending upon the pre-programmed CCR contents. The iteration counter and the block counter keep track of the number of iterations remaining and Block size, by keeping track of the number of instructions dispatched. Whenever the Block Counter reaches to a count of zero, the read pointer is reloaded with the value of read_pointer_stored and the Iteration counter is decremented by one. This process continues until the Iteration counter reaches to zero. When the Iteration counter reaches a value of zero, the Program memory read requests are issued. At this time, the Program Counter contents advance as required to proceed with the normal execution outside the SFPLOOP.

Figure 3C:
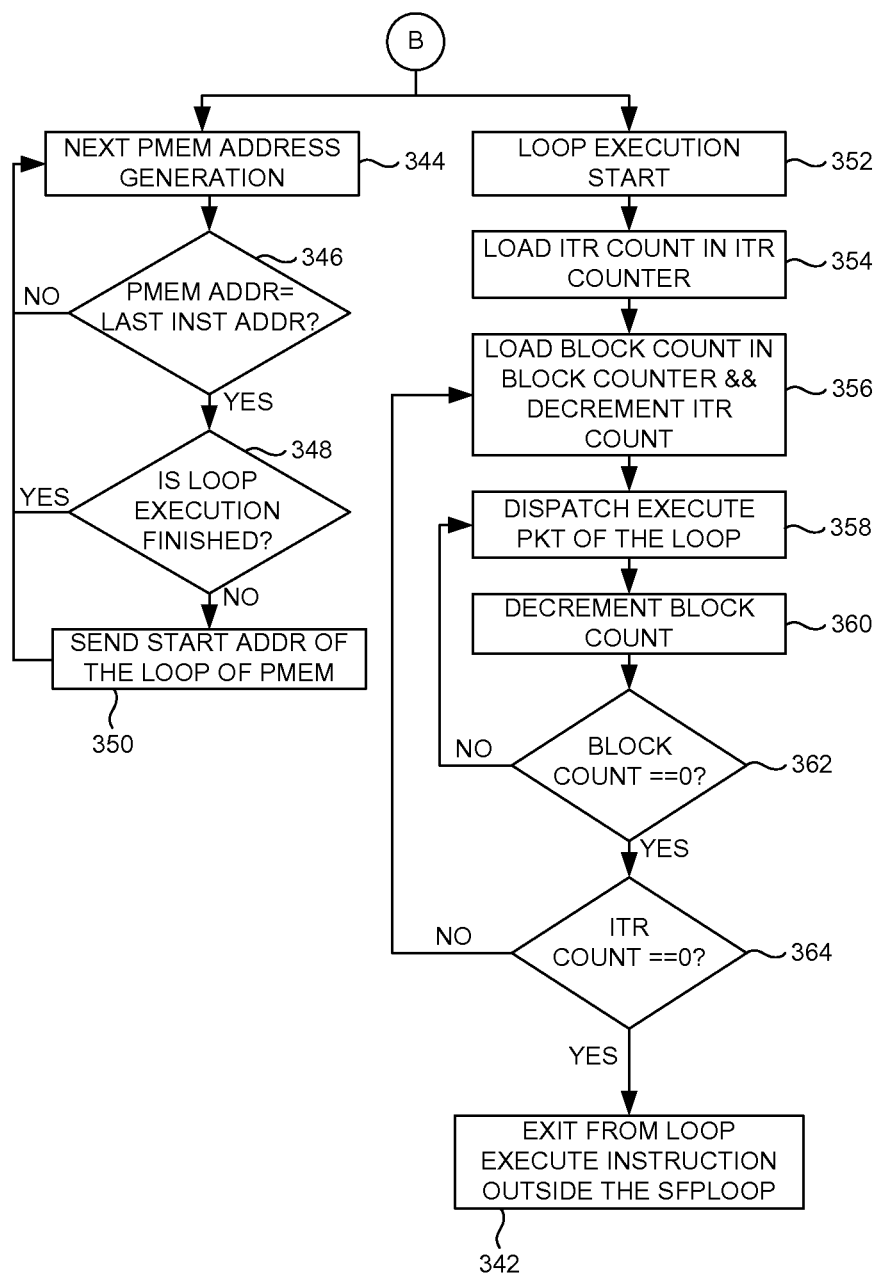
FIG. 3C is a continuation of FIG. 3A illustrating the Long SFP loop execution according to an embodiment herein.

FIG. 3C is a continuation of FIG. 3A illustrating the Long SFP loop execution according to an embodiment herein. In step 344, a next PMEM address is generated. In step 346, it is checked whether the PMEM address is equal to the last instruction address. If the PMEM address is equal to the last instruction address (if Yes), then it is checked whether the loop execution is finished in step 348. Else, (if No) step 344 is repeated. If the loop execution is finished then step 344 is repeated. Else (if No) a start address of the loop is sent to PMEM in step 350 and step 344 is repeated.

In parallel, with generating a next PMEM address, the loop execution is also started in step 352. In step 354, an iteration count is loaded in the iteration counter. In step 356, a block counter is loaded in a block counter and the iteration count is decremented. In step 358, an execute packet of the loop if dispatched. In step 360, the block count is decremented. In step 362, it is checked whether the block count is equal to zero (i.e., block count==0). If the block count is equal to zero (if Yes) then it is checked whether the iteration count is equal to zero in step 364, else step 358 is repeated. If the iteration count is equal to zero then step 342 is repeated, else step 356 is repeated.

In one embodiment, in the long SFPLOOP mode, the instruction that belongs to the loop is first fetched to the instruction buffer according to the execution packet priority that appears in the program and then dispatched to the respective slots. Subsequently, the next fetch packet is read from the program memory, depending upon the buffer space available in the instruction buffer.

This process is continued until all the instructions that belong to loop have been fetched. Once the program control reaches the fetch packet that contains the last instruction of the loop it start fetching from the start address of the loop and the whole process repeats. This process continues till the last but one iteration (ITERATION COUNT−1) of the loop. It is possible that last fetch packet may have more number of instructions than required for the SFP loop. In such cases, the instructions that don't belong to the loop are discarded and not written into the instruction buffer. However once the last pass of the iteration is reached these instructions outside the loop are fetched. This process may take a number of cycles depending upon the latency from the Program Memory in spite of initiating this process earlier in the previous iteration.

Figure 4A:
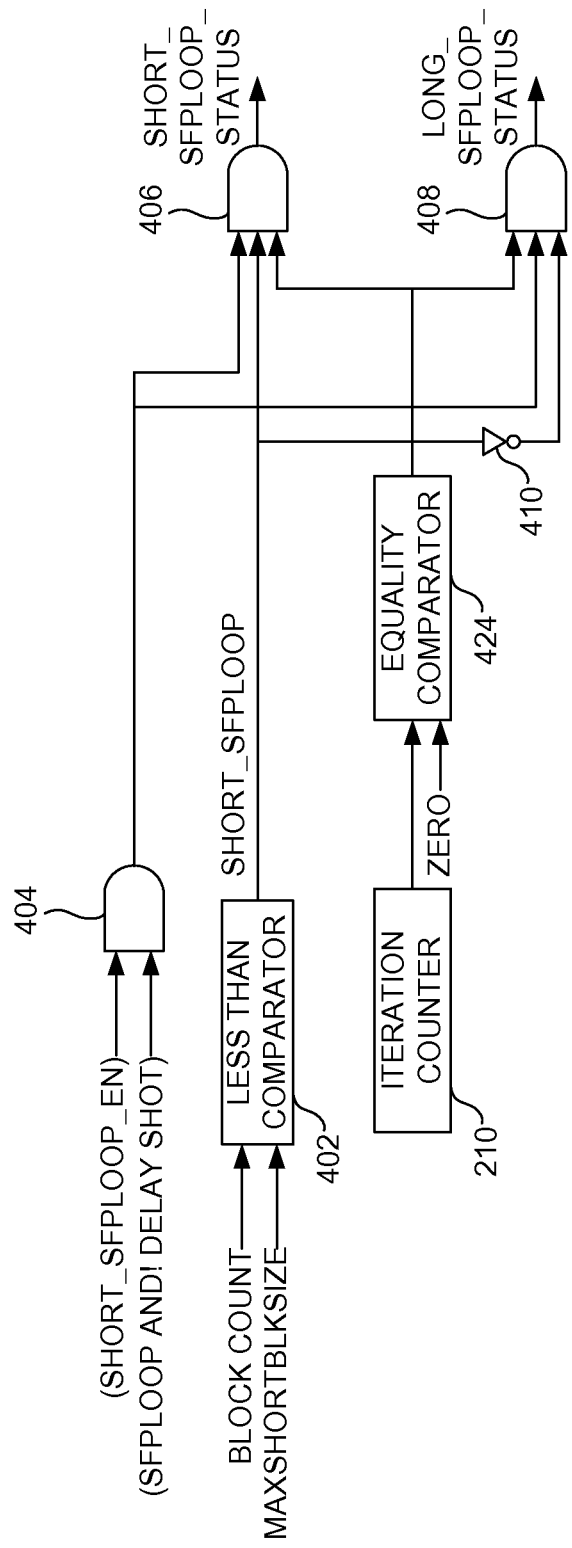
FIG. 4A and FIG. 4B illustrates generating of Control Signals from the SFPLOOP block 202 to the Instruction Buffer 206 of FIG. 2 according to an embodiment herein.
Figure 4B:
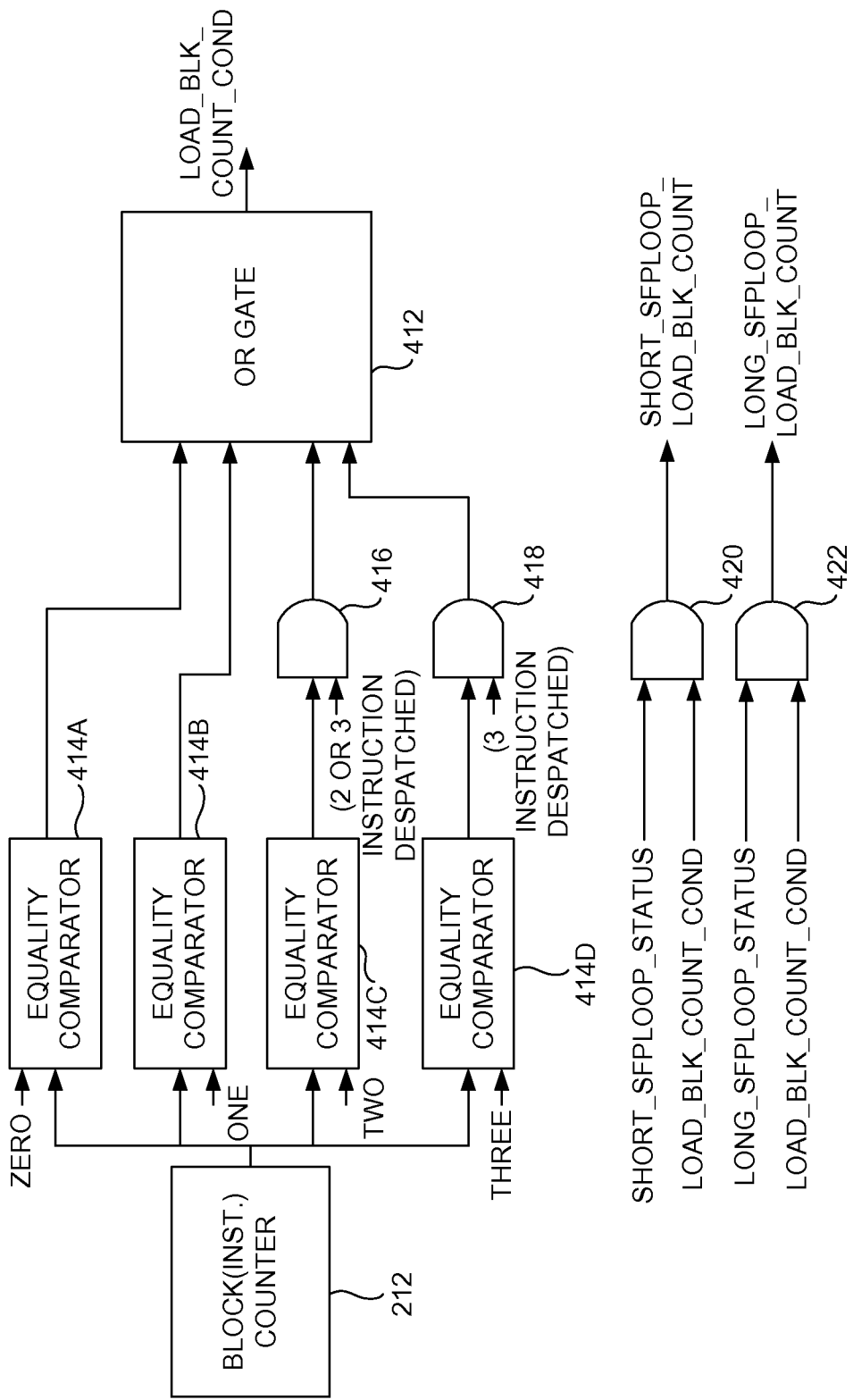

FIG. 4A and FIG. 4B illustrates generating of Control Signals from SFPLOOP block 202 to Instruction Buffer 206 according to an embodiment herein. It includes a short_sfp_en signal, a short_sfploop_status signal, a long_sfploop_status signal, a load_blk_count_cond signal, a short_sfploop_load_blk_count signal and a long_sfploop_load_blk_count signal. An iteration count is loaded in the iteration counter block 210. The output of equality comparator 424 is active if the iteration count is equal to zero. The block count and the MaxSHORTBLKSize are fed as the inputs to the less than comparator block 402. The "short_sfploop_signal" is active if Block Count is less than MaxSHORTBLKSize. The AND operation performed by the gate 404, is active if short_sfploop_en signal generated by detection of short SFPLOOP condition in the decoder is active when SFPLOOP condition is detected and the current instruction is not a delay slot instruction, when iteration counter equals the value of zero.

A short_sfploop_status signal is generated using a AND gate 406. This signal is used to indicate that the Program control is currently executing SFPLOOP instructions. The signal goes high when loop instruction execution starts and goes low when the last iteration of the loop completes. The long_sfploop_en signal is generated as an active high signal if a long sfploop condition is detected in the decode phase. The long_sfploop_status signal is generated through a AND operation using an AND gate 408. The long_sfploop condition is generated by an AND operation of !short_sfploop (where inversion happens using an invertor 410), the output of AND gate 404 and output of equality comparator which detects when the iteration counter equals the value of zero.

The load_blk_count_cond signal is generated while the Block (inst) counter 212 has the values zero, one, two and three. When the Block (inst) counter 212, after comparison at an equality comparator 414A is found equal to zero, it performs the OR operation through an OR Gate 412 to generate the load_blk_count_cond signal. When the Block (inst) counter 212, after comparison at an equality comparator 414B is found equal to one (block count=1), it performs the OR operation using the OR gate 412 to generate the load_blk_count_cond signal. When the Block (inst) counter 212, after comparison at an equality comparator 414C is equal to two, and when 2 or 3 instructions are dispatched, an AND operation is performed at an AND gate 416 to generate the load_blk_count_cond signal through the OR operation using the OR gate 412.

When the Block counter, after comparison at an equality comparator 414D is equal to three, and 3 instructions are dispatched the AND operation is used at an AND gate 418 to generate the load_blk_count_cond signal through the OR operation using the OR gate 412.

The short_sfploop_load_blk_count signal is generated through the AND operation using a AND gate 420 by combining the signals short_sfploop_status and load_blk_count_cond. This is used at the time when the last execution packet of the current iteration is dispatched while inside a short sfploop. The long_sfploop_load_blk_count signal is generated through an AND operation using a AND gate 422 by combining the signals long_sfploop_status and load_blk_count_cond. This is used at the time when the last execution packet of the current iteration is dispatched while inside a long sfploop.

Figure 5:
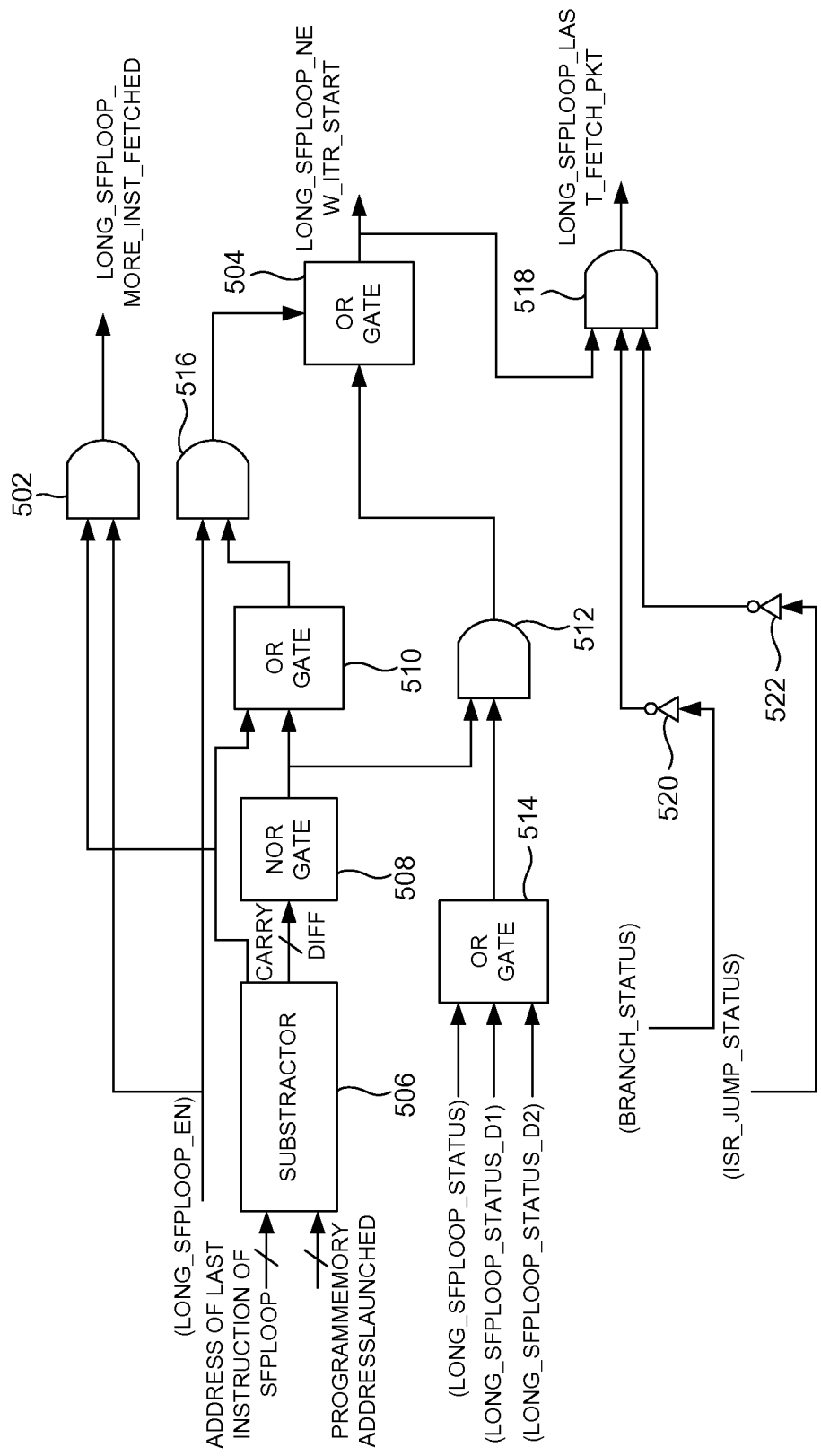
FIG. 5 illustrates generating of Control Signals from the SFPLOOP block 202 to the Instruction Buffer 206 of FIG. 2 according to an embodiment herein.

FIG. 5 illustrates generating of Control Signals from the SFPLOOP block 202 to the Instruction Buffer 206 of FIG. 2 according to an embodiment herein. It includes the generation of the following signals: Long_sfploop_more_inst_fetched signal, long_sfploop_new_itr_start signal long_sfploop_last_fetch_pkt signal. The Long_sfploop_more_inst_fetched signal is generated using the long_sfploop_en signal and carry signal of subtractor 506 using a AND gate 502. The carry signal of subtractor is active when the address launched for program memory address is greater than address of the last instruction of the SFPLoop. This long_sfploop_more_inst_fetched signal is generated to indicate when additional instructions are fetched from the instruction buffer for the long sfploop. The long_sfploop_new_itr_start signal is generated through OR operation using a OR gate 504 which includes the following operations.

The subtractor 506 performs the subtract operation between the Program memory address launched and the address of last instruction of SFPLOOP. The NOR operation on the computed difference using a NOR gate 508 is active high when both the inputs are equal. An OR operation is carried out on the carry output of subtractor 506 and output of NOR gate 508 using an OR gate 510. An AND operation is carried out on output of OR gate 510 and the long sfploop en signal at an AND gate 516 and the output signal is sent to OR gate 504. When the carry output of substractor 506 is active or output of NOR gate 508 is active while signal long_sfploop_en is high, the output of OR gate 504, long_sfploop_new_itr_start signal is active high. The OR gate 514 input signals are long_sfploop_status, and its 1 cycle and 2 cycles delayed versions in the form of signals long_sfploop_status_d1 and long_sfploop_status_d2. The output of the NOR operation from the NOR gate 508 is anded with output of OR gate 514 using the AND gate 512 and if this is active high the output of OR gate 504 long_sfploop_new_itr_start is active high.

The OR gate 504 outputs a new iteration start signal for a long SFP loop. In one embodiment, the long_sfploop_new_itr_start signal generated is used at the time when the program control jumps back to the start address of the sfploop for the next new iteration. This signal goes high whenever the long sfploop starts the next iteration. The long_sfploop_last_fetch_pkt signal is generated through the AND operation performed at a AND gate 518 when the signals long_sfploop_new_itr_start signal, an inverted output of a branch_status signal obtained by an inverter 520, and an inverted output of a isrjump_status signal obtained by an inverter 522, are fed as input to the AND gate 518.

Figure 6:
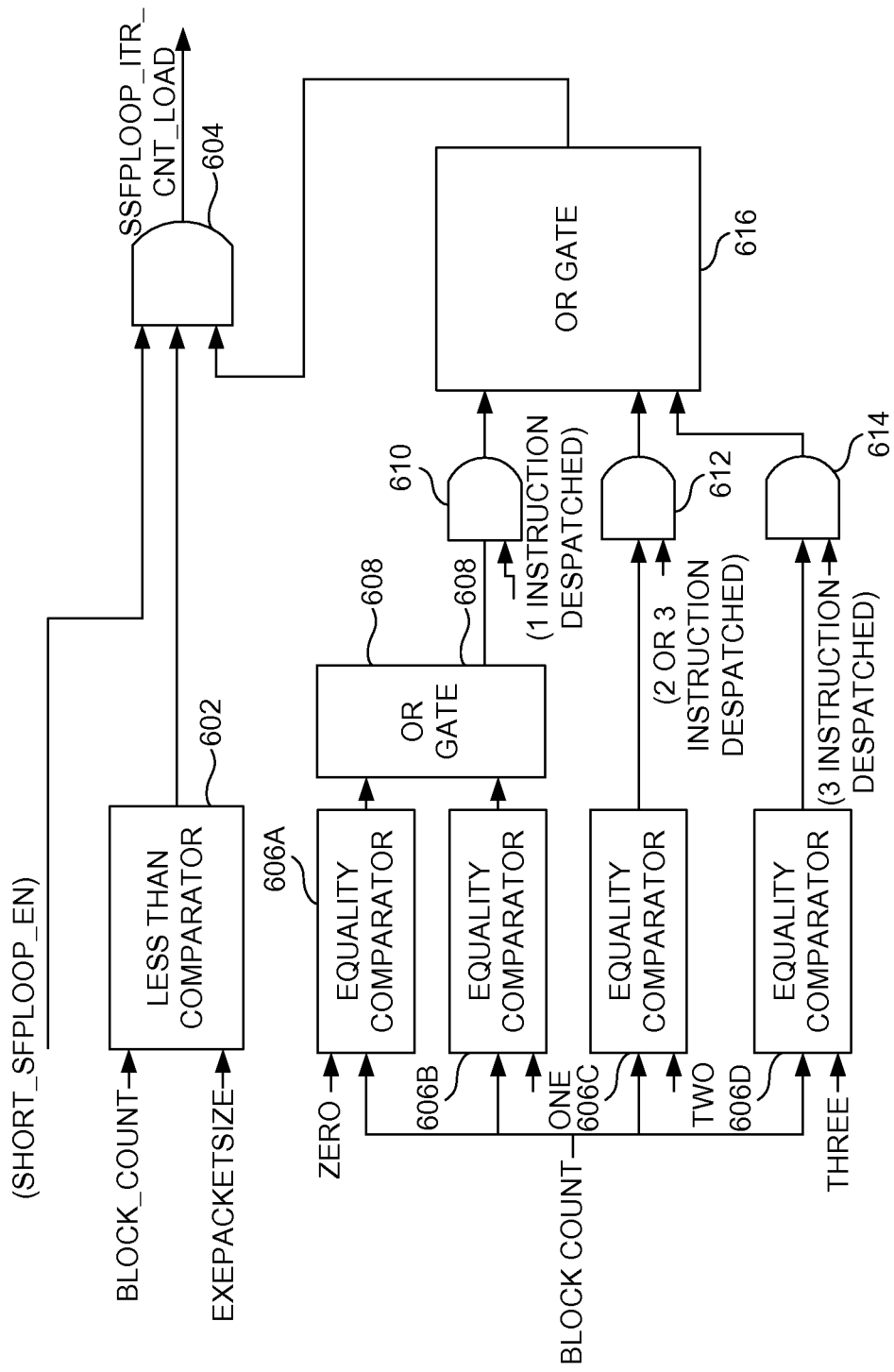
FIG. 6 illustrates generating of Control Signals from the SFPLOOP block 202 to the Instruction Buffer 206 of FIG. 2 according to an embodiment herein.

FIG. 6 illustrates generating of Control Signals from the SFPLOOP block 202 to the Instruction Buffer 206 of FIG. 2 according to an embodiment herein. It includes a sfploop_itr_cnt_load signal. A block count (e.g., block_count) and exePACKETSize (the size of one execute packet) are fed as inputs to less than comparator 602. In a preferred embodiment, the block count is compared in an equality comparator 606A-D. In one embodiment, when the Block Count is equal to zero or one, obtained by doing OR operation of output of equality comparators 606A and 606B at an OR gate 608, and 1 instruction is dispatched using a AND gate 610 the output of OR gate 616 is active. In another embodiment, when the Block Count is equal to two and 2 instructions are dispatched the output of OR gate 616 is active if output of AND gate 612 is high. In yet another embodiment, when the Block count is equal to three and 3 instructions are dispatched using a AND gate 614 the output of OR gate 616 is active.

The AND operation performed in the AND gates 610, 612 and 614 forms input signals for an OR operation which is performed in a OR gate 616. In an embodiment Sfploop_fetch_inst_sel signal is generated as 2 bit signal to show the number of instructions that do not belong to the sfploop and is discarded in the last fetch packet. The short sfploop_itr_cnt_load signal is generated by performing an AND operation using a AND gate 604. In one embodiment, the AND operation is performed on the short_sfploop_en signal, and a signal when the Block count is less than the Execute Packet size and the output signal of the OR operation from the OR gate 616 to output the Short SFP loop iteration count signal.

Figure 7:
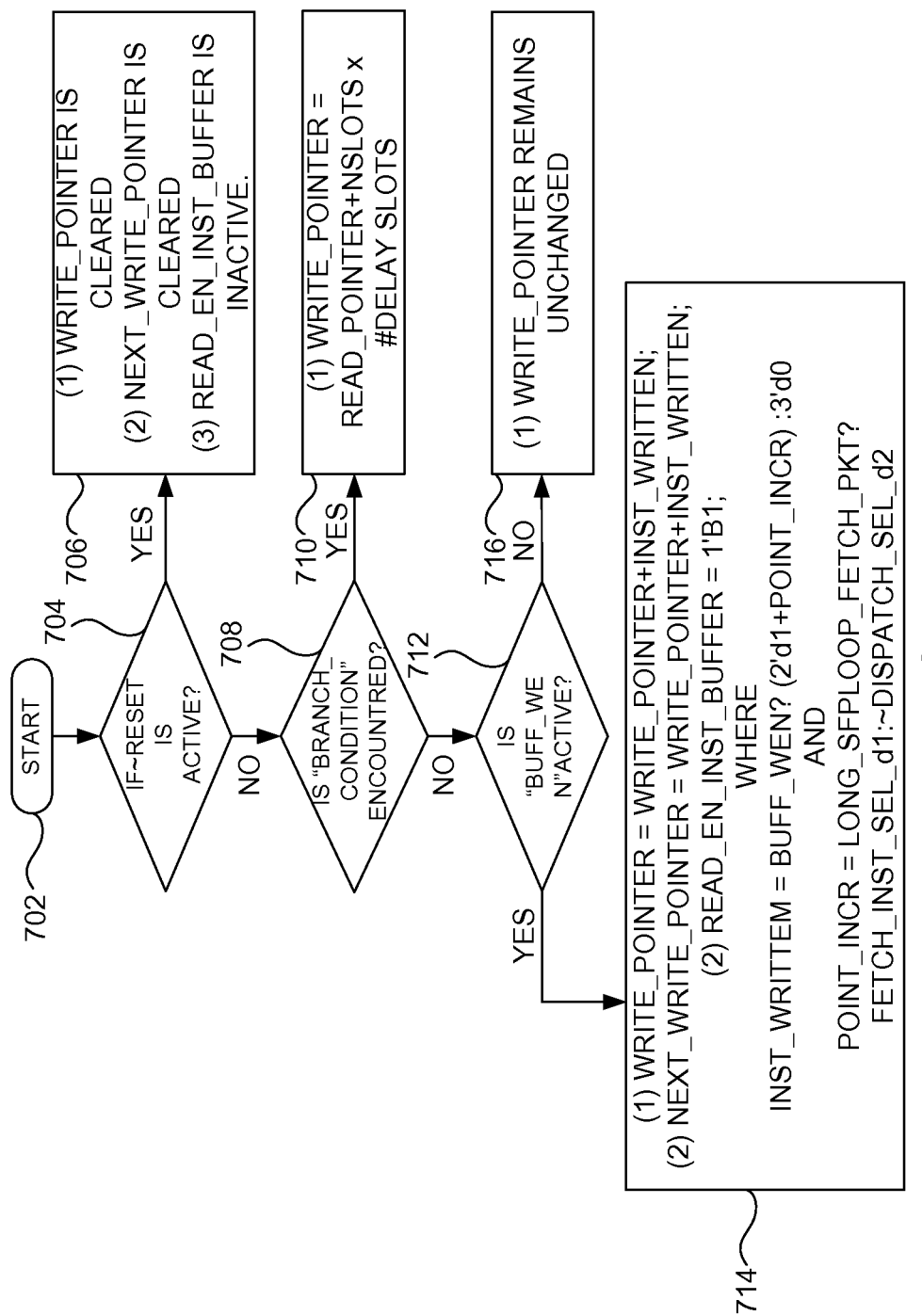
FIG. 7 is a flow diagram illustrating the behavior of Write Pointer of Instruction Buffer with respect to SFPLOOP control signals according to an embodiment herein.

FIG. 7 is a flow diagram illustrating the behavior of Write Pointer of Instruction Buffer with respect to the SFPLOOP control signals according to an embodiment herein. In step 702 the write pointer of the instruction buffer behavior is started. In step 704, it is checked whether the write pointer reset is active. If it is active (if Yes) then in the step 706 "write_pointer" is cleared and the "next_write_pointer" is cleared and "read_en_inst_buffer" is inactive. If the write pointer is not reset (if No) then in the step 708 it is checked whether the branch_condition is encountered.

If the branch_condition is encountered (if Yes) then in the step 710 write pointer of the instruction buffer is manipulated to point to N slots multiplied by number of delay slots ahead of the read pointer. If the branch_condition is not encountered (if No) then in step 712 it is checked whether the "buff_wen" (write enable signal of instruction buffer) is active. If it is active (if Yes) it performs step 714.

In step 714, following operations are performed: Write_pointer is assigned a value equal to (write_point+inst_written), next_write_pointer is assigned a value equal to (write_pointer+inst_written), and read_en_inst_buffer is assigned a value equal to 1'B1. Where inst_written=buff_wen? (2'd1+point_incr):3'd0 and point_incr=long_sfploop_fetch_pkt? fetch_inst_sel_d1:~dispatch_sel_d2.

When a long SFP loop is encountered the delayed version of sfploop_fetch_inst_sel signal is used to determine the increments of write pointer. When there is no SFP loop currently active the write pointer increments based on the number of valid instructions in the fetch packet as reflected by the signal ~dispatch_sel_d2. If the buff_wen is not active (if No) then in the step 716 the write_pointer remains unchanged.

Figure 8A:
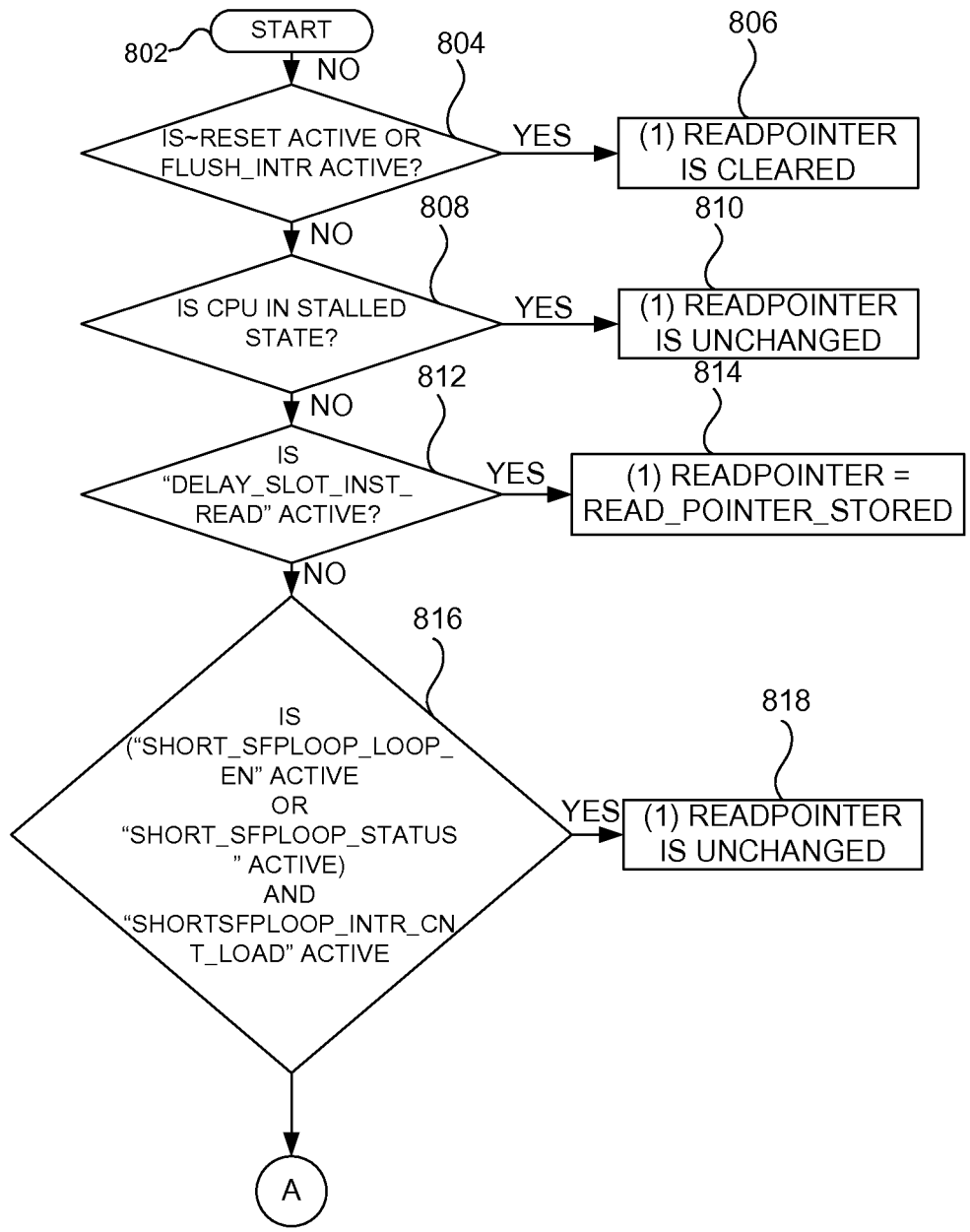
FIG. 8A is a flow diagram illustrating the behavior of Read Pointer of Instruction Buffer with respect to SFPLOOP control signals according to an embodiment herein.

FIG. 8A is a flow diagram illustrating behavior of Read Pointer of Instruction Buffer with respect to SFPLOOP control signals according to an embodiment herein. In step 802 the read pointer of the instruction buffer behavior is started. In step 804 it is checked whether active low reset is active or flush_intr signal is active. If reset is low or flush_intr is active (if Yes) then in the step 806 read pointer is cleared. If it is not satisfied (if No) then in the step 808 it is checked whether the CPU in stalled state. If the CPU is installed state (if Yes) then in the step 810 the read pointer is unchanged. If the CPU is not in stalled state (if No) then in the step 812 it is checked whether delay_slot_inst_read is active (where the signal delay_slot_inst_read indicates whether instructions in delay slot are currently read or not). If it is active (if Yes) then in the step 814 the read pointer stored value is restored to the instruction buffer read pointer. If it is not active (if No) then in the step 816 it is checked whether the signal short_sfploop_loop_en is active or the signal short_sfploop_status is active and shortsfploop_itr_cnt_load is active. If all the conditions are satisfied as true (if Yes) the in the step 818 the read pointer is left unchanged. This is because one single fetch packet contains all the instructions.

Figure 8B:
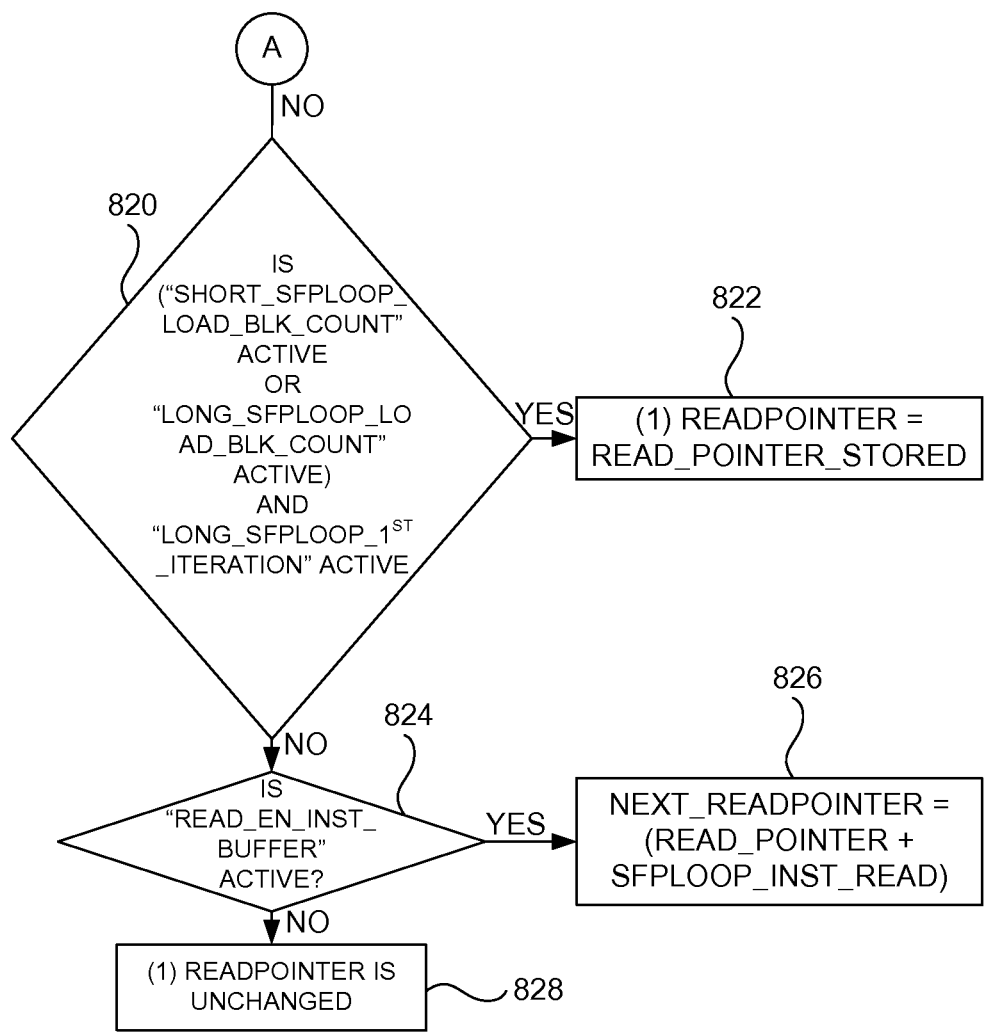
FIG. 8B is a continuation of FIG. 8A illustrating a continuation of the flow diagram according to an embodiment herein.

FIG. 8B is a continuation of FIG. 8A illustrating a continuation of the flow diagram according to an embodiment herein. If it is not active (if No) then in the step 820 it is checked whether the short_sfploop_load_blk_count is active or long_sfploop_load_blk_count is active while $1^{st}$ iteration of long sfploop (shown by signal long_sfploop_$1^{st}$_iteration) is currently active. If it is active (if Yes) then in the step 822 the read pointer_stored value is restored at the end of SFPLOOP iteration. If it is not active (if No) then in the step 824 it is checked whether the read_en_inst_buffer signal is active. If it is active (if Yes) then in the step 826 the read pointer increments based on the number of instructions taken by the dispatcher. If it is not active (if No) then in the step 828 the read pointer is kept unchanged.

Figure 9:
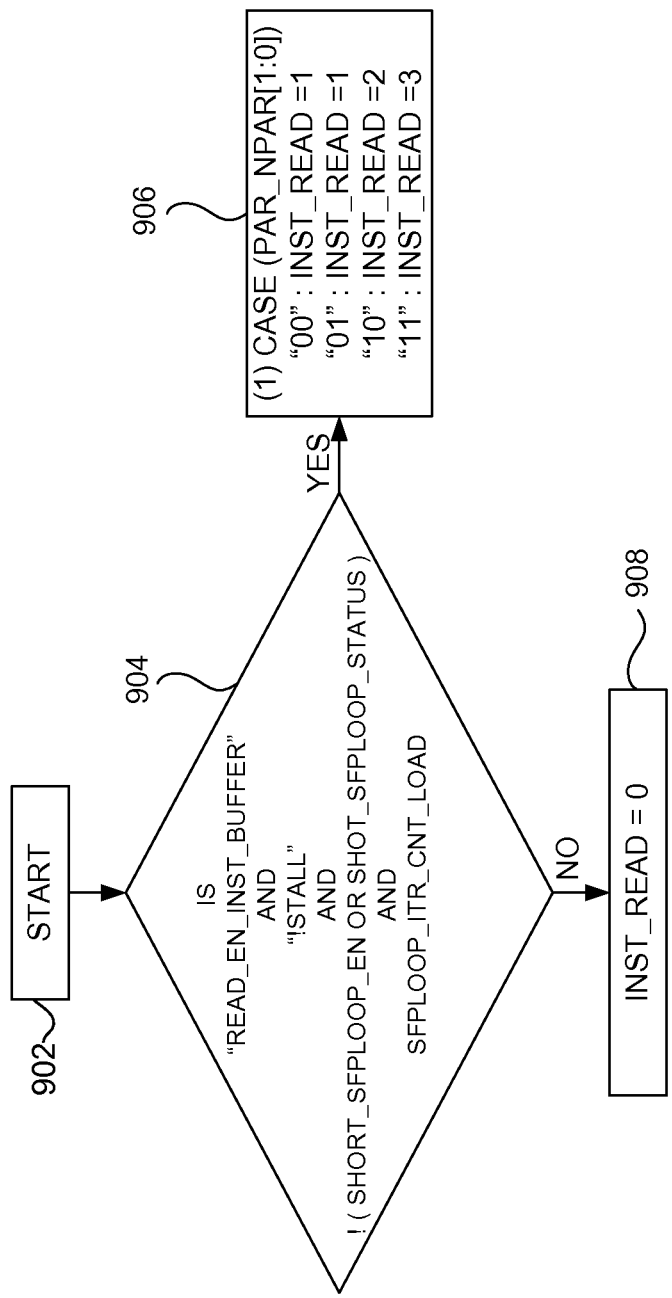
FIG. 9 is a flow diagram illustrating a method of number of instruction read from the Instruction Buffer according to an embodiment herein.

FIG. 9 is a flow diagram illustrating a method of number of instruction read from the Instruction Buffer of FIG. 2 according to an embodiment herein. In step 902 the instructions to be read are started. In step 904 it is checked whether instruction buffer is read when CPU is not stalled and if it is not within a short SFPLoop (as shown by inversion of combined OR of signals short_sfploop_en signal and short_sfploop_status signal) when SFPLOOP iteration counter is being loaded (as shown by the active state of sfploop_itr_cnt_load signal). If this is satisfied (if Yes) then the step 906 is executed for reading the instructions from the instruction buffer. If the condition is not satisfied then in the step 908 no instructions are read.

Figure 10:
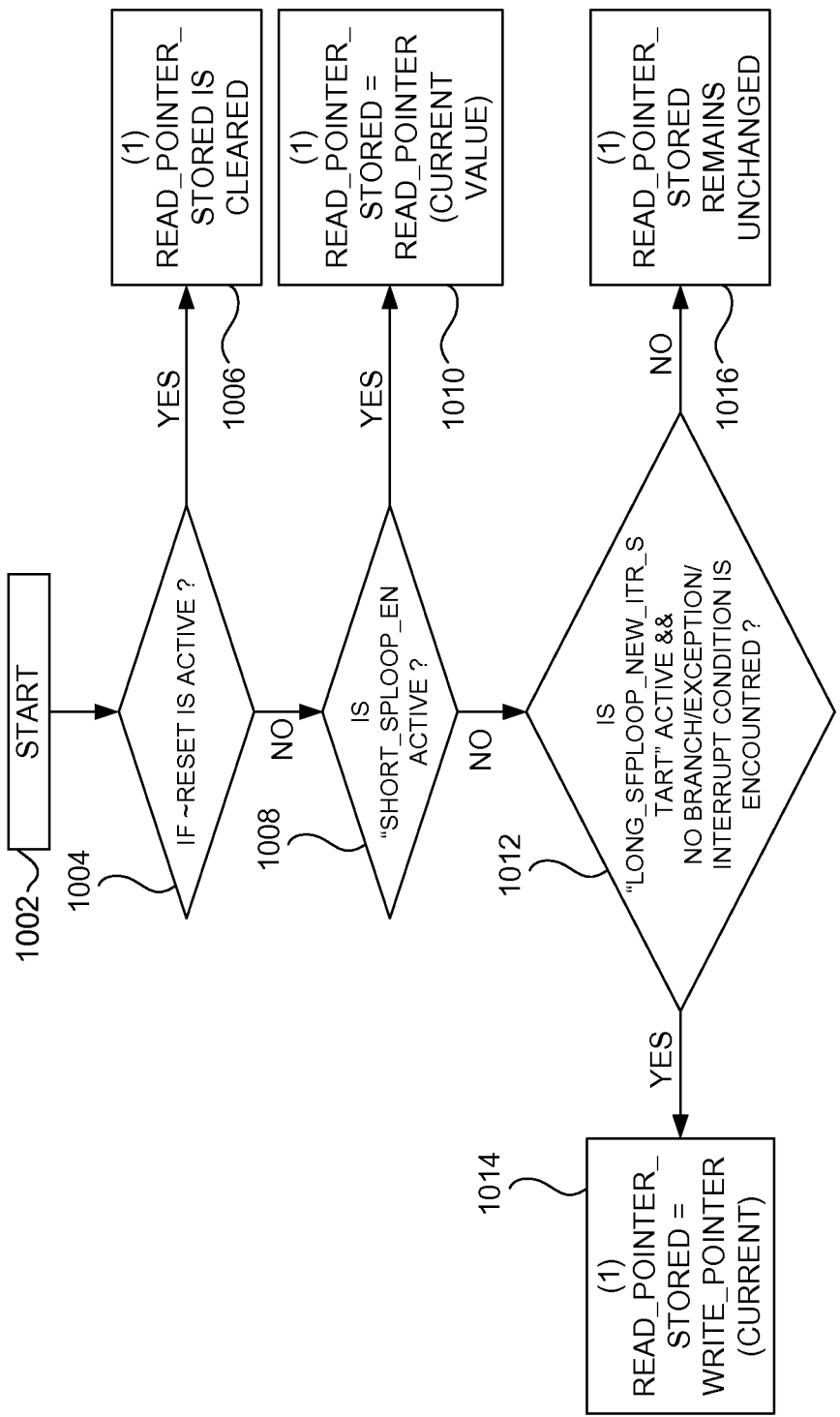
FIG. 10 is a flow diagram illustrating a method of behavior of Stored Read pointer with respect to SFPLOOP Control signals according to an embodiment herein.

FIG. 10 is a flow diagram illustrating a method of behavior of stored read pointer (indicated by signal "read_pointer_stored") of the instruction buffer in response to SFPLOOP Control signals according to an embodiment herein. In step 1002 behavior of read pointer is started. In step 1004, it is checked whether reset is active. If active low reset and is active then in the step 1006 read_pointer_stored is cleared. If reset is not active (if NO) then it is checked whether the short_sfploop_en signal is active in step 1008. If the signal is active (if Yes) then the current read pointer instruction buffer at the time when SFPLOOP is decoded in the decode phase is stored and restored back in step 1010. If the short_sfploop_en signal is not active then it is checked whether the long_sfploop_new_itr_start signal is active and also it is checked that there is no branch or exception or interrupt condition is encountered 1012. If the condition is satisfied (if Yes) the current write pointer of the instruction buffer is stored since this is the location corresponding to the start of the instruction buffer, from where the loop should start re-executing in step 1014. If it is not satisfied (if No) then the read_pointer_stored remains unchanged in step 1016.

Figure 11:
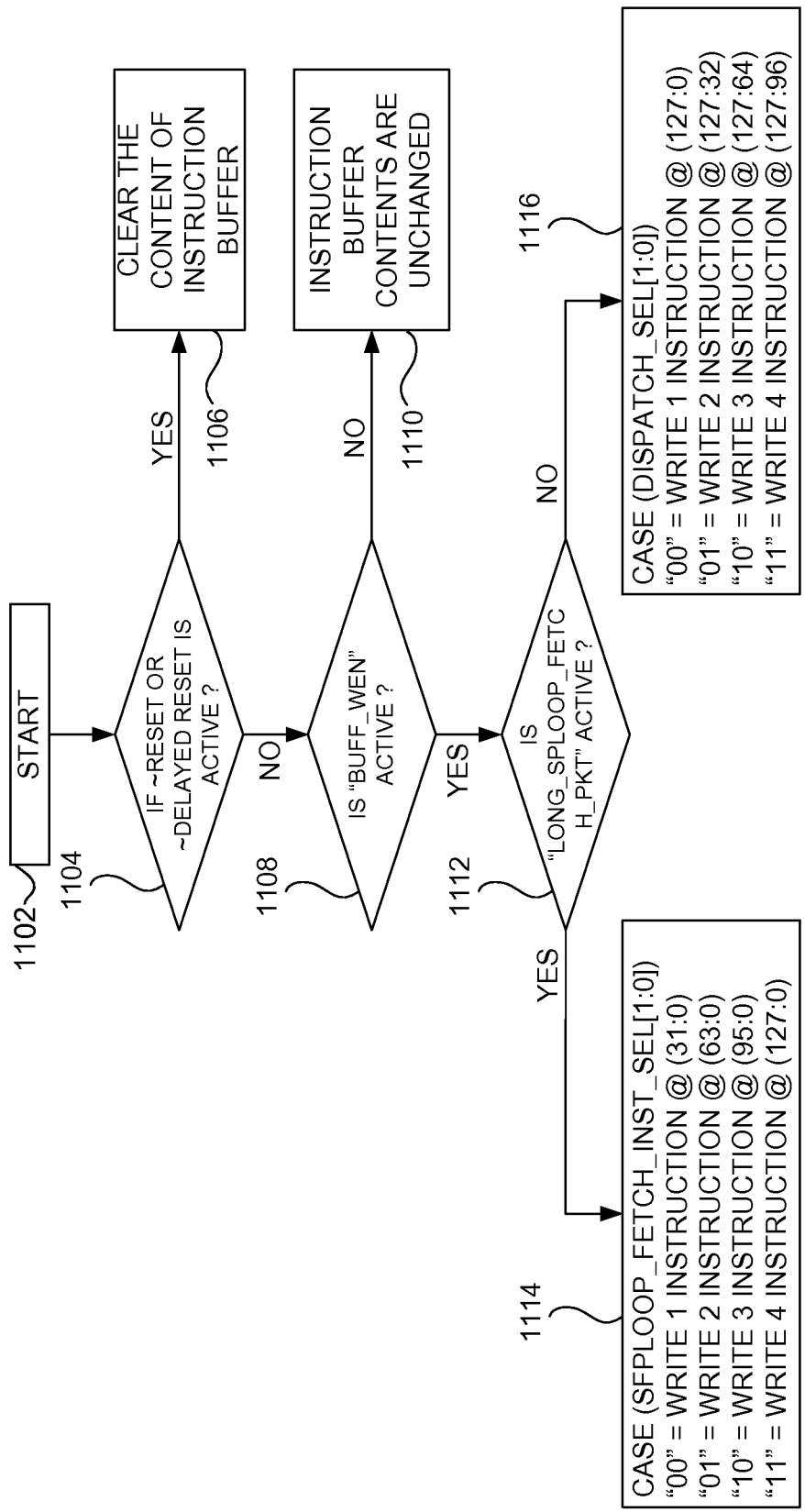
FIG. 11 is a flow diagram illustrating a method of Instruction Buffer contents modification during SFPLOOP instructions according to an embodiment herein.

FIG. 11 is a flow diagram illustrating a method of Instruction Buffer contents modification during SFPLOOP instructions according to an embodiment herein. In step 1102 the Instruction Buffer contents modification started. In step 1104 it is checked whether reset or the delayed reset is active. If it is active (if Yes) then in the step 1106 the contents of instruction buffer are cleared. If it is not active (if No) it is checked if the signal buf_wen active in step 1108. If it is not active (If No) then in the step 1110 the instruction buffer contents are unchanged. If it is active (if Yes) then in the step 1112 it is checked whether the long_sfploop_fetch_pkt is active. If it is active (if Yes) then in the step 1114 the instructions are written based on the different cases of sfploop_fetch_inst_sel(1:0) signal. If it is not active (if No) then in the instructions are written based on the different cases of dispatch_sel as shown in step 1116.

The embodiments herein achieve this by providing a mechanism, where arbitrarily large loops can be implemented with zero overhead (either in single-issue or VLIW type of processors), without any limitation of an instruction buffer size. Further, a program memory is closely coupled with the instruction buffer size to implement the zero overhead software pipelined (SFP) loop for larger loops.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system to implement a zero overhead software pipelined (SFP) loop, said system comprising:
    a Very Long Instruction Word (VLIW) processor having a N number of execution slots, said VLIW processor executes a plurality of instructions in parallel without any limitation of an instruction buffer size;
    a program memory that receives a Program Memory address to fetch an instruction packet, wherein said program memory is closely coupled with an instruction buffer and a dispatcher to implement said zero overhead SFP loop, wherein said zero overhead SFP loop is at least one of a short zero overhead SFP loop and a long zero overhead SFP loop, and wherein a size of said zero overhead SFP loop exceeds said instruction buffer size;
    at least one CPU control register comprising a block count and a iteration count, wherein said block count is loaded into a block counter and a last instruction address of said zero overhead SFP loop is computed to check whether said block count is greater than a maximum short block size, wherein when said block count is greater than said maximum short block size, a long SFP loop is executed, wherein when said block count is less than said maximum short block size, a short SFP loop is executed, and wherein said iteration count is loaded into an iteration counter and counts a number of iterations of said zero overhead SFP loop based on said block counter;
a loop instruction fetch logic that tracks at least one instruction of said plurality of instructions; and
a control logic that generates at least one of a control signals received by a instruction buffer, wherein said control signals are generated to execute said zero overhead SFP loop.

2. The system of claim 1, wherein said iteration counter is initially loaded and decremented by one when said block count reaches zero.

3. The system of claim 1, wherein said block counter is initially loaded with the block count and decremented by one when said at least one instruction is dispatched by said dispatcher.

4. The system of claim 1, wherein said zero overhead SFP loop reloads a fetch program address with a start address of said zero overhead SFP loop and continues until a last iteration when said number of instructions associated with said zero overhead SFP loop is being fetched.

5. The system of claim 1, wherein execution of said long SFP loop takes place in parallel with a generation of a next program memory address.

6. A method of implementing a short software pipelined (SFP) loop in a system, said system comprising:
a processor having a N number of execution slots, wherein said processor executes a plurality of instructions in parallel without any limitation of an instruction buffer size;
a program memory that receives a program memory address to fetch an instruction packet;
at least one CPU control register comprising a block count and an iteration count, wherein said block count is loaded into a block counter and counts said plurality of instructions executed in said short SFP loop, and said iteration count is loaded into a iteration counter and counts a number of iterations of said short SFP loop based on said block counter, said method comprising:
determining when an instruction of said short SFP loop is encountered at execution packet boundaries;
storing a start address on said instruction being encountered;
storing an iteration count in said iteration counter and storing said block count in said block counter;
computing a last instruction address; and
determining when said block count is greater than a maximum short block size, wherein said maximum short block size is equal to a minimum depth of instruction buffer minus a size of one fetch packet, and wherein said short SFP loop is executed when said block count is less than said maximum short block size.

7. The method of claim 6, further comprising:
generating a next program memory (PMEM) address;
determining when said PMEM address is equal to a last instruction address;
determining that an execution of said short SFP loop is finished when said PMEM address is equal to said last instruction; and
generating a next PMEM address when said execution of said short SFP loop is finished.

8. The method of claim 7, wherein no read request is sent to said PMEM address when said execution is not finished.

9. The method of claim 6, further comprising:
starting, in parallel with said generating said next PMEM address, an execution of said short SFP loop;
loading said iteration count into said iteration counter and saving a read pointer;
loading said block count into said block counter and decrementing said iteration count;
dispatching an execute packet;
decrementing said block count;
determining when said block count is equal to zero; and
determining when said iteration count is equal to zero when said block count is equal to zero.

10. The method of claim 9, wherein an execute packet of said short SFP loop is dispatched when said block count is not equal to zero.

11. The method of claim 9, wherein an execution is exited from a loop execute instruction outside said short SFP loop when said iteration count is equal to zero.

12. The method of claim 9, wherein a read pointer is reassigned with a saved read pointer when said iteration count is not equal to zero.

13. The method of claim 12, wherein said block count is loaded into said block counter and said iteration count is decremented when said read pointer is reassigned to said saved read pointer.

14. A method of implementing a long software pipelined (SFP) loop in a system, said system comprising:
a processor having a N number of execution slots, wherein said processor executes a plurality of instructions in parallel without any limitation of an instruction buffer size;
a program memory that receives a program memory address to fetch an instruction packet, wherein said program memory is closely coupled with an instruction buffer and a dispatcher to implement said long SFP loop, and wherein a size of said long SFP loop exceeds said instruction buffer size;
at least one CPU control register comprising a block count and an iteration count, wherein said block count is loaded into a block counter and counts said plurality of instructions executed in said long SFP loop, and said iteration count is loaded into the iteration counter and counts a number of iterations of said long SFP loop based on said block counter, said method comprising:
determining when an instruction of said long SFP loop is encountered at execution packet boundaries;
storing a start address when said instruction is encountered;
storing an iteration count and a block count;
computing a last instruction address; and
determining when said block count is greater than a maximum short block size, wherein said long SFP loop is executed when said block count is greater than said maximum short block size.

15. The method of claim 14, further comprising:
generating a next program memory (PMEM) address;
determining when said PMEM address is equal to a last instruction address;
determining that an execution is finished when said PMEM address is equal to said last instruction address; and
generating a next PMEM address when said execution is finished.

16. The method of claim 15, wherein an execution is exited from a loop execute instruction outside said long SFP loop when said block count and said iteration count values are equal to zero.

17. The method of claim 15, wherein a start address is sent to said PMEM address when said execution of said long SFP loop is not finished.

18. The method of claim 14, further comprising:
starting, in parallel with said generating said next PMEM address, an execution of said long SFP loop;
loading said iteration count into said iteration counter;
loading said block count into said block counter and decrementing said iteration count;
dispatching an execute packet;
decrementing said block count;
determining when said block count is equal to zero; and
determining when said iteration count is equal to zero when said block count is equal to zero.

19. The method of claim 18, wherein an execute packet is dispatched when said block count is not equal to zero.

20. The method of claim 18, wherein said block count is loaded into a block counter and said iteration count is decremented when said iteration count is not equal to zero.

* * * * *